Feb. 18, 1941.  F. G. SCHWALBE  2,232,638
LEHR
Filed Feb. 20, 1939  6 Sheets-Sheet 1
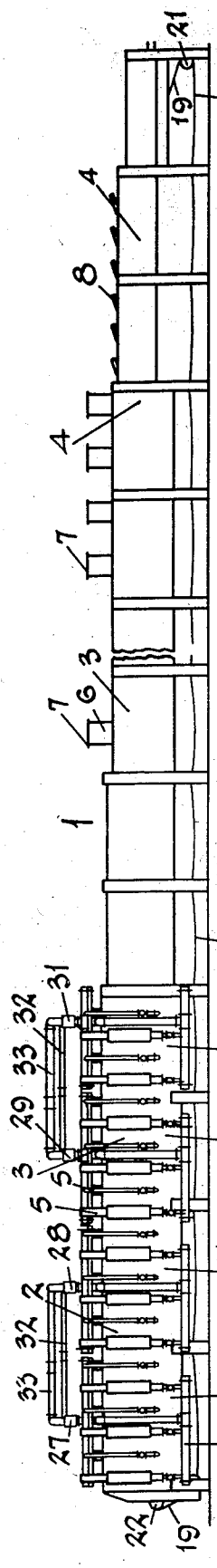
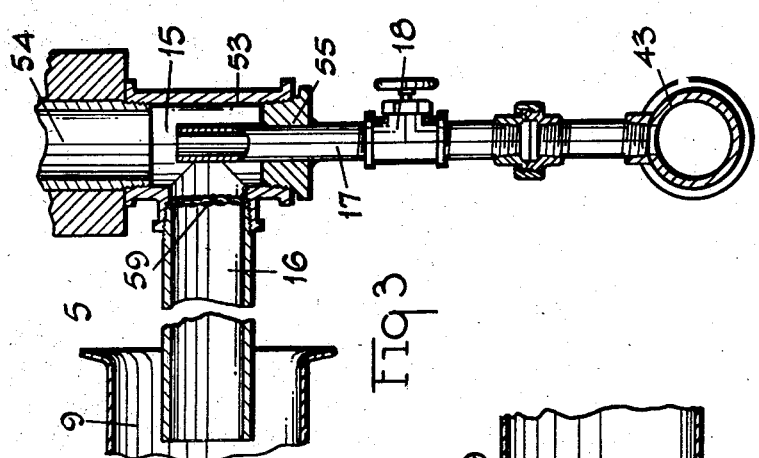
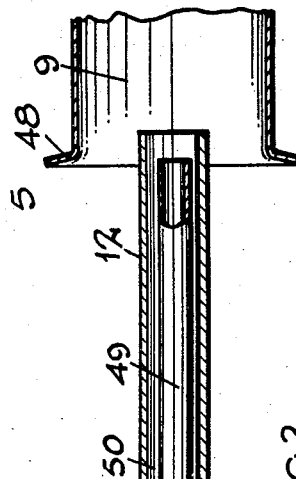
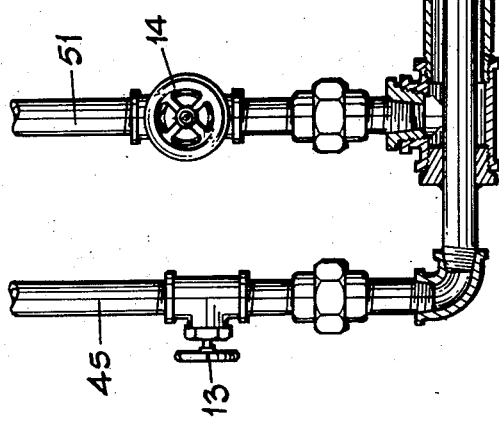
Inventor
Franz G. Schwalbe
By Ernest F. Crampton
Attorney Feb. 18, 1941. F. G. SCHWALBE 2,232,638
LEHR
Filed Feb. 20, 1939 6 Sheets-Sheet 2
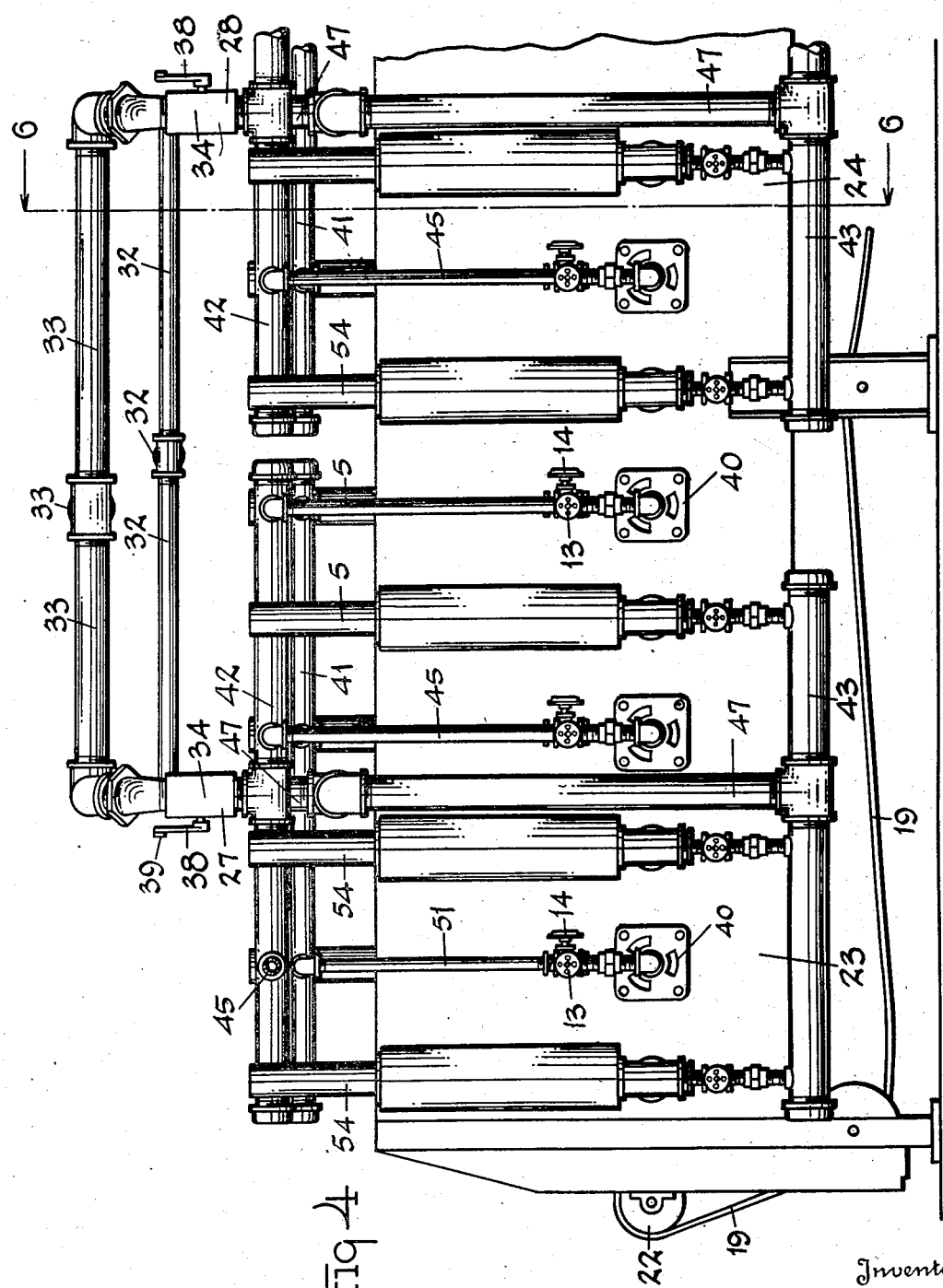
Inventor
Franz G. Schwalbe
By Faust F. Crampton
Attorney

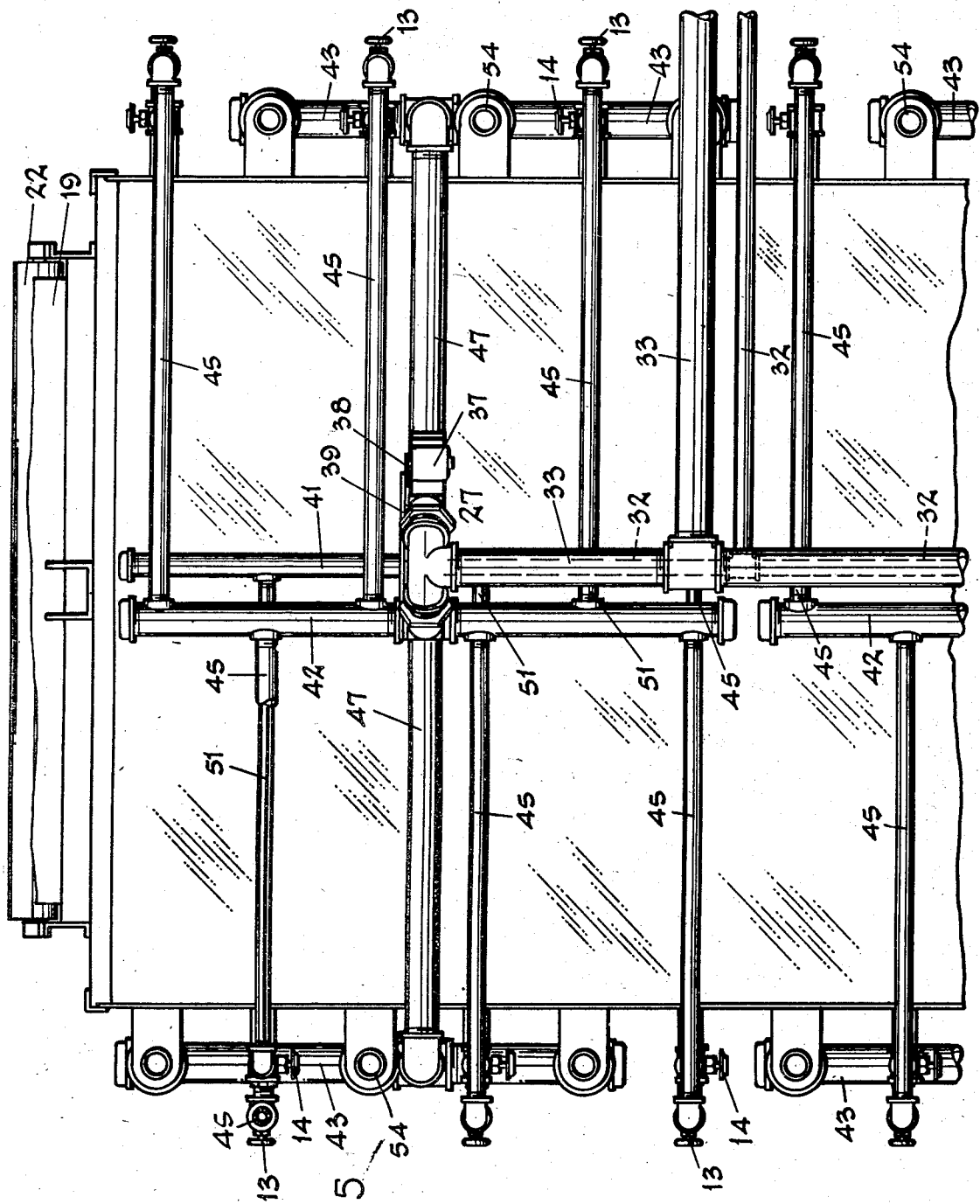

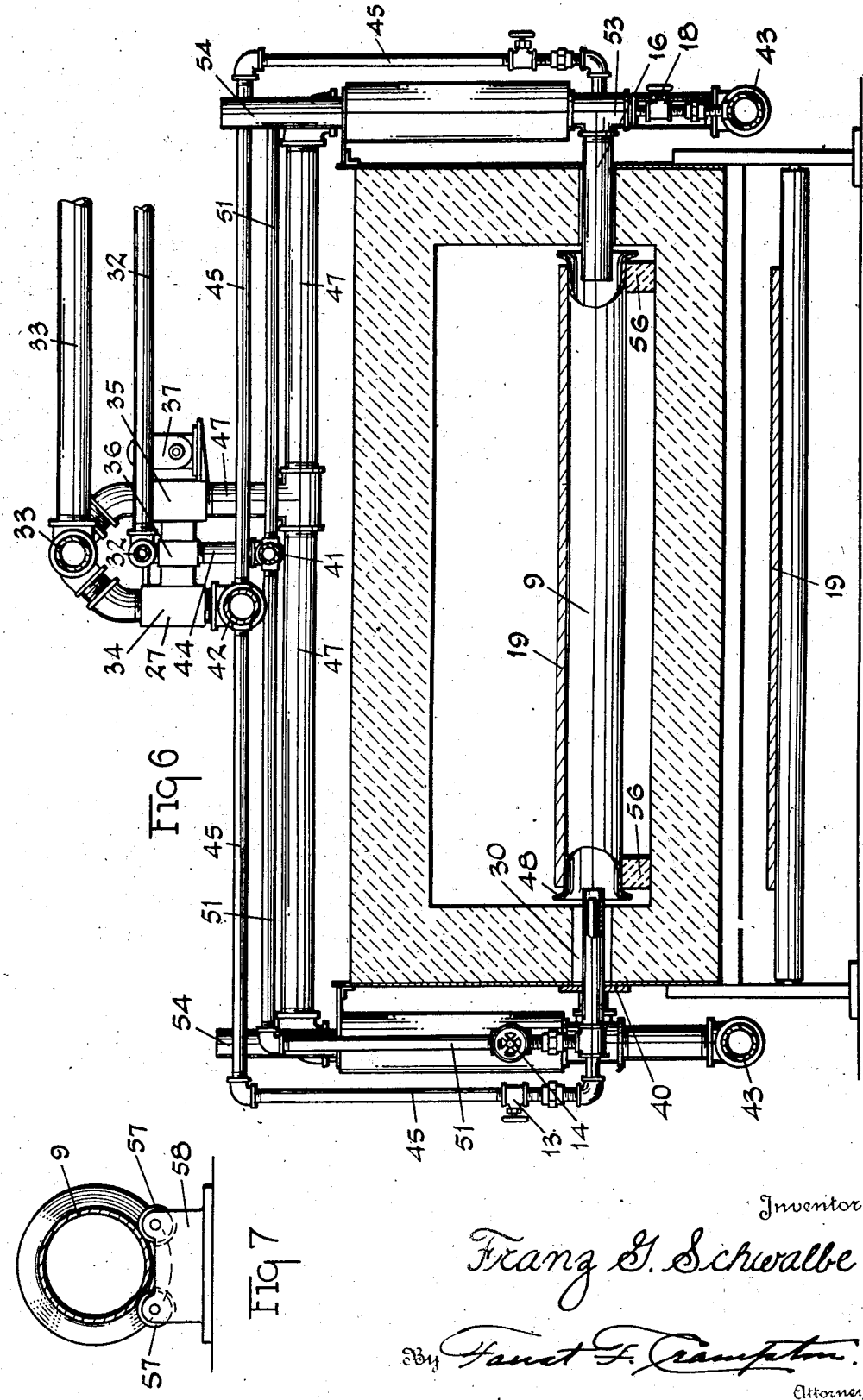

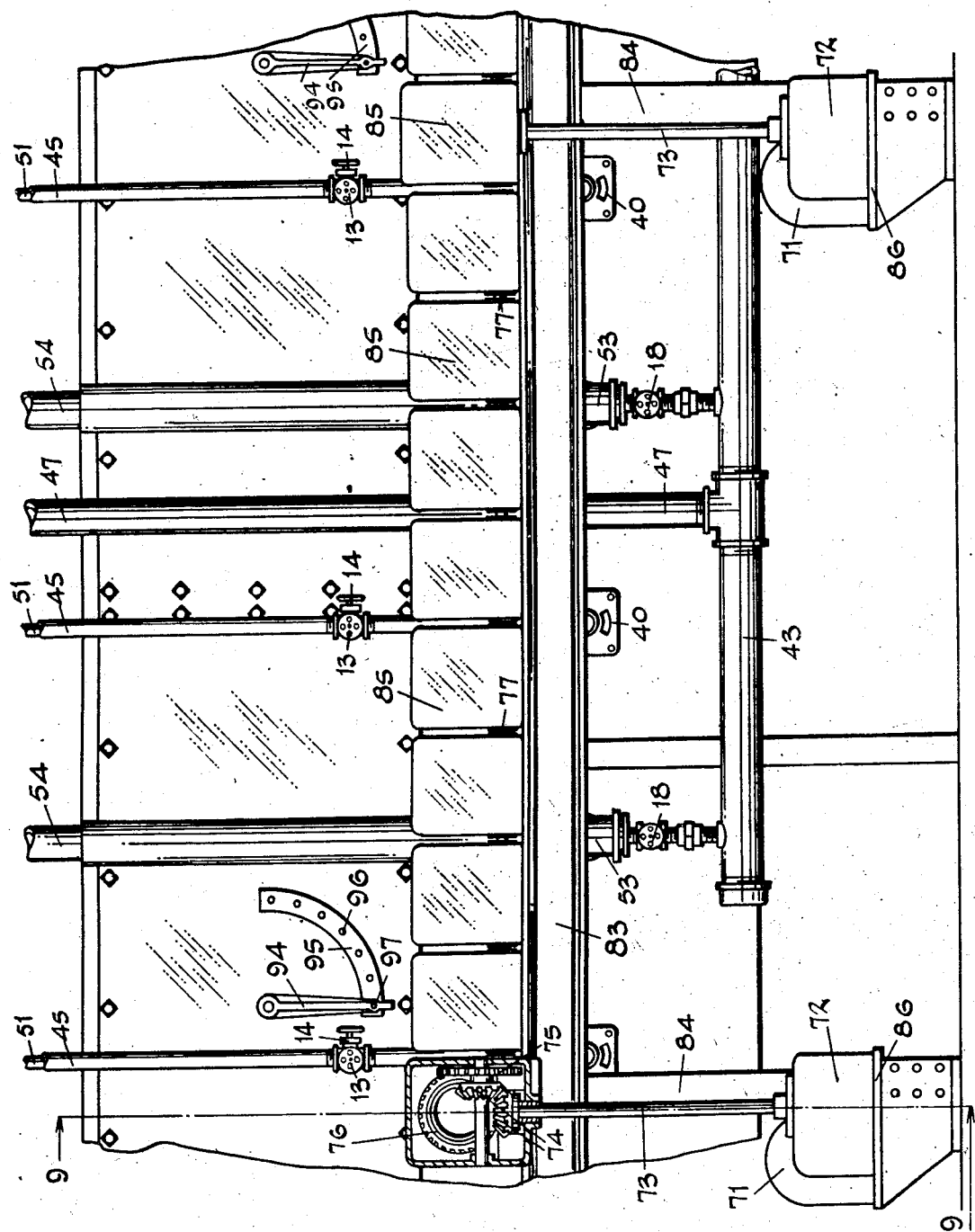

Feb. 18, 1941.   F. G. SCHWALBE   2,232,638
LEHR
Filed Feb. 20, 1939   6 Sheets-Sheet 6
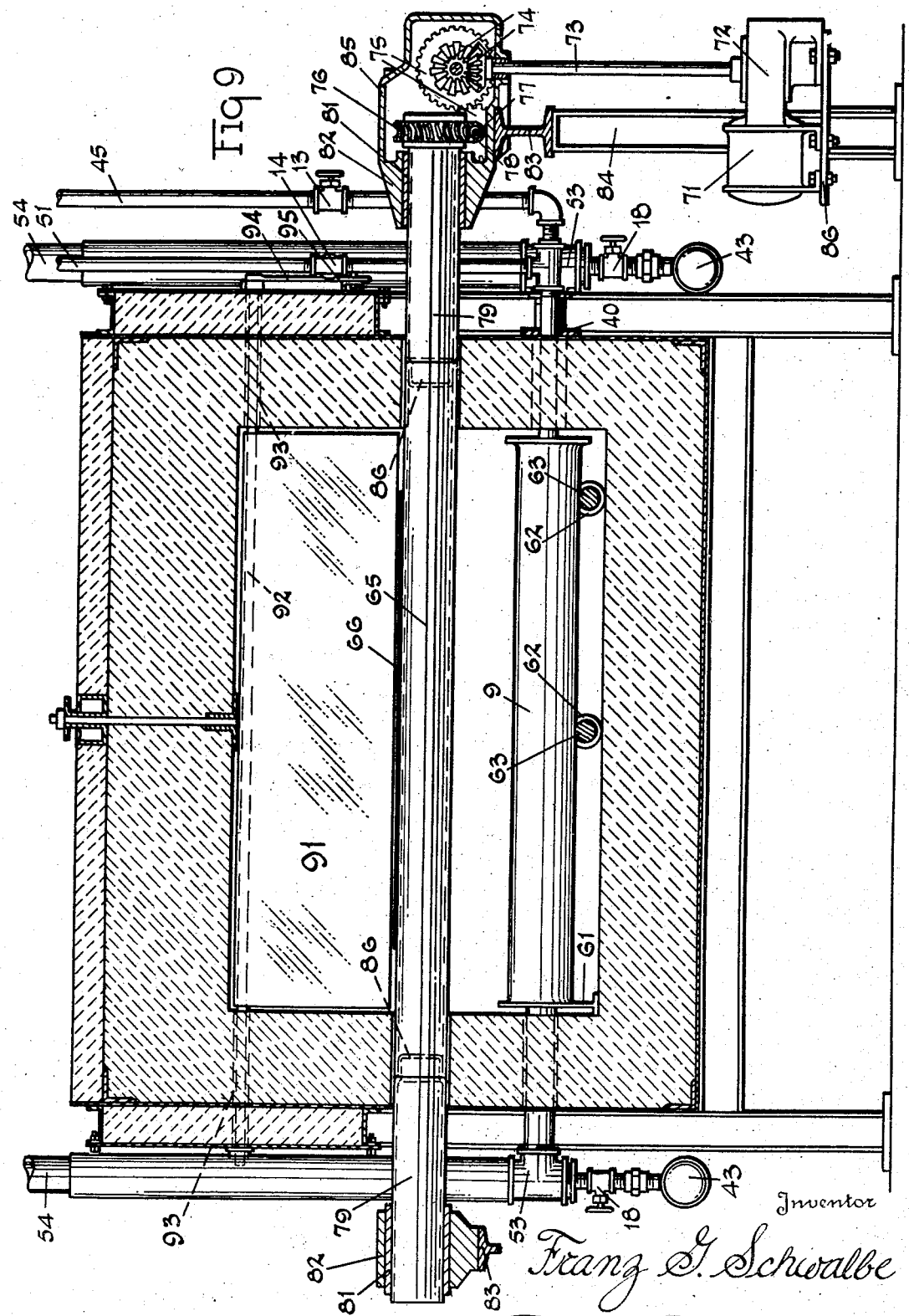
Inventor
Franz G. Schwalbe
By Faust F. Crampton
Attorney Patented Feb. 18, 1941

2,232,638

UNITED STATES PATENT OFFICE 2,232,638

LEHR

Franz G. Schwalbe, Toledo, Ohio

Application February 20, 1939, Serial No. 257,346

6 Claims. (Cl. 49—47)

My invention has for its object to provide an efficient means for heating glass-annealing lehrs. The invention particularly provides a lehr having a plurality of hollow radiants heated by flames projected within the radiants and regulated in the extent of their projection by variation of the differential pressure producing the injectment and the withdrawal of the exhaust products of the flame, that may, also, produce, if desired, a regulated movement of heated air from the radiants in the interior of the lehr and desired movement of heated gas between parts or through zones of the lehr. The invention, thus, provides means for producing a desired heat radiation from the radiants and desired pressures within the lehr in the region of each of the radiants to produce a desired distribution of heat throughout the heating and annealing zones of the lehr.

The invention, also, provides means for producing heated-gas flow at the opposite side walls and along the lehr to maintain uniform desired temperatures within each cross-sectional part of the lehr zones and to produce, if desired, progressive change in temperature in succeeding cross-sectional parts by the radiants.

The invention may be used for annealing a plurality of small articles, which may be supported on a belt that is moved through the lehr, or an extended or a continuous glass sheet may be moved through the lehr by disposing the glass sheet on rotating rollers.

The invention, also, provides a plurality of adjustable curtains extending crosswise the lehr and located above the glass conveyed through the lehr, and operative to confine the heat within the curtain-partitioning parts of the lehr above the glass, as produced by the heat radiants, and regulatively limiting the gas movements above the glass and causing substantially free movement and distribution of heated gas below the glass.

The invention may be contained in structures of different forms and to illustrate a practical application of the invention, I have selected two lehr structures embodying the invention as examples of the various structures containing the invention and shall describe the selected lehrs hereinafter, it being understood that structures containing my invention may be varied without departing from the spirit of the invention as presented in the claims. The particular lehrs selected are shown in the accompanying drawings.

Fig. 1 is a side view of one form of the lehr structure. Fig. 2 illustrates a part of the heating unit for heating the lehr shown in Fig. 1. Fig. 3 illustrates another part of the heating unit. The parts shown in Figs. 2 and 3 are shown in section to illustrate the interior arrangement of parts of the heating unit. Fig. 4 illustrates a side view of the receiving end of the lehr. Fig. 5 illustrates a top view of the end of the part of the lehr shown in Fig. 4. Fig. 6 illustrates a view of a section of the lehr taken on the plane of the line 6—6 indicated in Fig. 4. Fig. 7 is a view of a modified structure for supporting a part of one of the heating units. Fig. 8 illustrates the other form of lehr structure. Fig. 9 illustrates a view of a section taken on the plane of the line 9—9 indicated in Fig. 8.

The lehr 1, shown in the drawings, is divided into parts that may be referred to as the heating zone 2, the annealing zone 3, wherein the heat is maintained above the annealing temperature and is progressively lowered at a controlled rate, and the cooling zone 4, wherein the temperature is lowered at a rapid rate for removal and handling of the ware. A plurality of heating units 5 are located in the heating zone 2 while the annealing zone 3 is provided with a plurality of exhaust flues 6. The flues 6 may be connected to a stack, if desired, and provided with dampers 7 for regulating the outward movement of the air or gases within the lehr. The flues 6 coact to move the heated gases or air from the heating zone 2 to the forward end of the controlled cooling zone. Also, the cooling zone 4 is provided with a plurality of shutters 8 for producing a relatively rapid intake of cooling air into the delivery end of the lehr.

Each of the heating units 5 has a hollow opened-end radiant 9, that is located entirely within the lehr, and a flame pressure regulator, which comprises a burner 12 and air and fuel pressure valves 13 and 14 and pipes that project a flame into one end of the radiant, and an exhaust pressure regulator 15, comprising the exhaust and pressure pipes 16 and 17 and the valve 18 that withdraws gases from the other end of the radiant. The flame pressure regulators coact with the exhaust pressure regulators to produce desired flame lengths and corresponding heated areas of the wall surfaces of the radiants and a controlled pressure in the heating zone and, more particularly, within the region of each of the radiants 9.

The glass is conveyed through the lehr to progressively subject portions to the temperatures maintained in different parts of the lehr. Glass articles may be conveyed by a belt, such as the belt 19, which extends throughout the length of the interior of the lehr and is actuated by a suitable driving means which may be, if desired, connected to a pulley 21 located at the rear end of the lehr. The belt moves over a pulley 22 located at the entrance end of the lehr. The part of the belt within the heating zone is supported on the radiants. The remainder of the belt is supported on suitable rollers located below the bottom wall of the lehr. If the glass is in the form of a sheet, it may be supported on a plurality of rollers and moved through the lehr.

The heating units 5 are temperature controlled according to the temperature produced in sections of the heating zone 2 of the lehr, such as the sections 23, 24, 25, and 26. The flame and exhaust pressure regulators of each section are connected to a source of supply of air under pressure and to a source of supply of gas through valves that are controlled by the temperature existing in the sections in which the heating units are located. Thus, the heating units 5, located in the section 23, are controlled by a temperature regulator 27; those of section 24 are controlled by a temperature regular 28; those in the section 25 are controlled by a regulator 29; and those in the section 26 are controlled by a regulator 31. The regulators 27, 28, 29 and 31 are connected in pairs to pipes 32 and 33 that communicate, respectively, with sources of supply of gaseous fuel and with air under pressure.

The regulators 27, 28, 29 and 31 are provided with two air-regulator valves 34 and 35 and a gas-regulator valve 36 which are mounted side by side and are controlled by an electric motor means 37 that operates the valves of each of the regulators according to the operation of a thermostatic switch located in the sections of the heating zone 2 with which the regulator valves and the heating units are associated. The valves 34, 35, and 36 are connected together and to their associated motor means 37 to cause variation of the position of their respective movable members as the motor means is actuated. Each of the valves and their associated motor means is provided with an arm 38. A bar 39 is connected to the arms of the valves and the motor means in order to produce angular movement of the movable valve members of the valves 34, 35 and 36 when the motor means 37 is actuated in the manner well known in the art.

The flame pressure regulators are connected to manifolds 41 and 42 and the exhaust pressure regulators are connected to a manifold 43. The flame and exhaust pressure regulators of each radiant 9 are located on opposite sides of the lehr and the flame pressure regulator of contiguous radiants are located on opposite sides of the lehr to produce, by this alternate arrangement, substantial uniformity of heat distribution, cross-sectionally, within the lehr. The manifolds 41 and 42 are located above the lehr and are connected to the valves 36 and 34 respectively. The valves 13 are connected through the pipes 45 and the manifolds 42, to the valves 34, and the valves 14 are connected through the pipes 51 and the manifolds 41 and pipes 44 to the valves 36. The manifolds 43 are located at the sides of the lehr and are connected to the valves 35 by means of the pipes 47.

The radiants 9 are relatively large in diameter and, preferably, formed of relatively thin metal and suitably supported on the bottom wall of the lehr. When heated, they store considerable heat and, thus, retain the heat and coact to maintain uniformity of heat emission within the region in which they are located. Also, by reason of the alternate location of the flame and exhaust pressure regulators of the contiguous radiants with respect to the side walls of the lehr they coact to produce uniformity of heat distribution.

The opposite ends of each of the radiants 9 terminate in outwardly flaring flanges 48 and the burner 12 is disposed in a position with respect to its associated radiant to project the flame axially into the interior of the radiant. Also, the pressure pipe 16 projects well within the interior of the radiant from the opposite open end and axially with respect to the radiant. Each burner 12 has a central pipe 49 that is connected through the valve 13 to the pipe 45 through which air under pressure is directed from its associated manifold 42 to the end burner. The pipe 49 is located within a sleeve 50, which, preferably, protrudes slightly beyond the end of the pipe 49 and is located within the end of the radiant 9. The sleeve 50 has an inner diameter larger than the exterior diameter of the pipe 49 and forms an annular space surrounding the pipe 49. The pipe 49 and the pipe 50 extend through an opening 30 formed in the wall of the lehr. The outer end of the opening may be covered by a damper 40. Gas is conducted from the manifold 41 through the pipe 51 and the valve 14 to the end of the burner 12 and is projected from the end of pipe 50 into the radiant 9, according to the pressures of the air, which is conducted through the pipes 45, the valve 13 and the pipe 49.

The pipe 16 projects through the opposite side wall of the lehr and well into the other open end of the radiant. The pipe 16 has an exterior diameter that is considerably less than the inner diameter of the radiant 9. To the outer end of the pipe 16 is connected a T-fixture 53. A flue 54 is connected to the T-fixture 53. The flue 54 extends upwardly and may be connected, if desired, with a suitable conductor flue for conducting exhaust products to a stack. The T-fixture is, also, provided with a suitable plug 55 through which the pressure pipe 17 extends. The inner end of the pipe 17 is, preferably, located above the center of the T-fixture 53 to produce a pressure within the pipe 16 and the end part of the radiant 9 less than atmospheric pressure when the valve 18 is opened to connect the pipe 17 with the manifold 43. This operates to draw products of combustion from the radiant 9 at a desired pressure and direct it into the flue 54.

The flame pressure within one end part of each radiant is controlled by the valves 13 and 14 and the exhaust pressure within the other end part of each radiant is controlled by the valve 18. Adjustments of the valves 13, 14 and 18 produce varied differential pressures within the radiant 9 so that where the flame pressure produced by the burner fuel is relatively high and the exhaust pressure is low there will be a pressure higher than atmospheric within the radiant 9 which will cause the outward movement of heated gases from within the radiant and into the interior of the lehr and the flame will be projected well within the radiant. The relatively small pipe 16 prevents entrance of the gas flame when the excess pressures are used. The pipe 16 may be provided, if desired, with a reticulated screen 59 that will cool the gases and prevent entrance of the flame into the exhaust pipe 54 to a material degree. If the flame pressure is increased the area heated by the flame will be extended and, consequently, the area of heat radiation from the outer surface of the radiant will be extended. Where, on the other hand, the pressure produced by the flame pressure is relatively low and the exhaust pressure is relatively high, that is materially below atmospheric, there will be no outward flow of the gas from the radiant 9 although the flame will be projected well within the radiant and, if there is a sufficient pressure differential due to the exhaust pressure, there may be an inward flow of gases from the lehr into the radiant and through the flue 54, outwardly from the lehr.

Thus, the invention provides a means for regulating and directing movements of the air within the lehr in accordance with the desires of the lehr operator, such as by supplying pressure to the heated zone to produce either a slight outward air movement at the entrance end of the lehr and, thus, prevent the inward movement of cool air into the lehr, or a movement of a larger quantity of heated gas to the annealing zone as may be determined by the adjustment of the valves 13, 14 and 18 controlling the gas, air, and exhaust flow to and from the various radiants located in said various zones. The invention, also, provides means for regulating and directing the movements of lehr air within the immediate vicinity of each individual radiant, as well as in zones, to, thus, obtain the maximum efficiency from the heat given off by each radiant and in accordance with the character of the article passing through the lehr.

As the articles are conveyed on the belt 19, they will be carried through the heated zones and progressively heated according to the conditions that exist in the different parts of the heated zone to above the required critical temperature. In the annealing zone the articles may be maintained at a substantially uniform temperature above the required critical temperature and then gradually cooled as they progress through the annealing zone until they reach the cooling zone where they are more rapidly cooled. The articles are then removed from the belt 19.

The radiants may be supported upon ridges formed of refractory blocks, such as the blocks 56, or they may be supported by means of rollers, such as the rollers 57, that are supported on the bases 58 that are located on the bottom wall of the lehr. The belt 19 may, in the form shown in Fig. 6, slide over the radiants 9, or the radiants may roll on the rollers 57 as the belt 19 is moved through the lehr. The flanges 48 at the ends of the radiants operate to retain the belt 19 in proper position with respect to the radiants 9 whether the radiants 9 are held stationary, as in the form shown in Fig. 6, or the radiants rotate, as in the form shown in Fig. 7.

In the form of construction illustrated in Figs. 8 and 9, the lehr is heated by means of the radiants 9, which are provided with the same gas pressure and exhaust pressure regulative means to produce the desired pressure differentials within the radiants and, particularly, at the open ends of the radiants, and which may be either positive or negative to produce the desired flow of heated gas along the lehr, as may be determined by the pressures that exist at the open ends of the lehr, whereby the glass in the heating and cooling zones of the lehr may be progressively modified, and the desired temperature may be maintained in the central zone, as may be required to anneal the glass. The radiants in the lehrs shown in Figs. 8 and 9, instead of being supported at opposite ends, either by piers or ridges located on the bottom wall, as shown in the form of lehr illustrated in Figs. 1 to 7, may be fixedly supported at one end by means of a bracket 61, and located on rollers 62 that may be supported on suitable shafts 63 extending lengthwise the lehr. The rollers 62 permit extended movements of an end part of each radiant due to change in temperature of the radiant as it is heated by the fuel gas that is introduced into one end of the radiant.

A plurality of rollers 65 are located above the radiants 9. The rollers 65 extend crosswise the lehr and are located in spaced relation, substantially throughout the zones of the lehr. The rollers 65 are relatively closely disposed to each other to support sheet glass that may be directed or fed to the lehr as it is drawn from the forehearth of a furnace and directed through the lehr by the rollers 65 to anneal the glass. As the glass is delivered from the lehr, it is cut into commercial sizes.

The broad ribbon of glass 66 is conveyed through the lehr by the rotation of the rollers 65. The rollers 65 may be rotated by any suitable driving means, such as the electric motor 71. The motor is connected through a reducing gear, located in the gear box 72, the shaft 73, and the bevel and spur gear wheels 74 and 75, to the shaft 77 that extends along one side of the lehr. The shaft 77 is provided with a plurality of worms 78 that mesh with the worm gear wheels 76, mounted on the rollers 65, for causing the rollers 65 to rotate at the same rate and, thus, convey the sheet glass 66 from near one end of the lehr to the other end of the lehr. If desired, a plurality of driving motors, such as the motor and rality of driving motors, such as the motor and its transmission gear, may be distributed along the lehr because of the length of the lehr to relieve the torque on the shaft 77.

End parts 79 of the rollers 65 that protrude from the sides of the lehr, are rotatably supported in bushings 81 located in bearing blocks or heads 82 which may be mounted on I-beams 83 that are supported by suitable standards 84. The heads 82, located on one side of the lehr, may be provided with gear boxes 85 in which the worm gears 76 and 78 are located, and, where the driving connection is made with the motor 71, the gear boxes 85 may be slightly enlarged to enclose the bevel gears 74 and 75. The heads 82 of the other side of the lehr may, also, be supported on an I-beam 83 and by standards 84. The motor 71 may be supported on a suitable shelf or bracket 86 that may be secured to one of the standards 84.

The rollers 65 are, preferably, formed hollow and the end parts 79 are partitioned from the central parts of the rollers 65 by the walls 86 to prevent heat radiation from the central portions of the rollers to the bearings that support the rollers. The rollers 65 may be formed in sections that are suitably secured together, as by interfitting parts that are welded together, the length of the central sections of the rollers having lengths such as to locate the partitioning walls 86 within the walls of the lehr, and the end sections or parts 79 having lengths to locate the end parts 79 of the rollers in the heads 82.

The lehr is provided with a plurality of sheet metal curtains 91 that extend crosswise the lehr and are supported on and connected to the rods 92, but are oscillatably supported in sleeves 93 that are located in the side walls of the lehr. The curtains are spaced along the zones of the lehr and extend from the top wall of the lehr to near the glass and, thus, subdivide the zones into sections where the heat of the gas maintains a high temperature above the glass, particularly at the top wall of the lehr, and the cooler air is conveyed beneath the edges of the curtains, according to the adjustment of the curtains.

The curtains 91 are adjusted relative to the glass, by movement of the rods 92. The rods are moved by the arms 94, each arm being connected to an end of each of the rods 92. The arms 94 move over the sectors 95 having spaced openings 96 in which pins 97, carried by the arms 94, may be inserted to adjustably position the lower edges of the curtains with reference to the glass and, thus, control movement or discharge of the cooler gas within the lehr and intermixture of the heated and cooler gases within the lehr and the desired temperature within the sections of the lehr.

I claim:

1. In a lehr, a tempering chamber for tempering glass articles; a plurality of hollow radiants located in the tempering chamber, each radiant having openings connecting the interior of the radiant with the interior of the tempering chamber; a flame pressure regulator for projecting a flame of desired pressure into each of the radiants; means, individual to each radiant, for withdrawing products of combustion therefrom and for varying the pressure at the openings to the tempering chamber relative to the pressure produced therein by the flame pressure regulator to vary the zonal temperature in the tempering chamber; and means for moving glass articles through the tempering chamber.

2. In a lehr, a tempering chamber for tempering glass articles; a plurality of hollow, heat-controlled radiants, located in the tempering chamber, for forming different zonal temperatures in the chamber, each radiant having openings connecting the interior of the radiant with the interior of the tempering chamber; a flame pressure regulator for projecting a flame of desired pressure into each of the radiants; an exhaust pressure regulator, individual to each radiant, for withdrawing products of combustion therefrom and cooperable with the flame pressure regulator to vary the pressure produced in the tempering chamber and in the region of each radiant and cause movement of the heated gases in the chamber and maintain the zonal temperatures; and means for moving glass through the tempering chamber.

3. In a lehr, a tempering chamber for tempering glass articles; a plurality of hollow, heat-controlled radiants, located in the tempering chamber, for forming different zonal temperatures in the chamber, each radiant having an opening for connecting the interior of the radiant with the interior of the tempering chamber; a burner having means for directing a flame into each of the radiants; a combustion-gas exhaust pipe protruding to a point within each of the radiants and having means, individual to each radiant, for withdrawing products of combustion from within the radiant, in the vicinity of the opening, to vary the pressure at the opening and control the movement of the heated gases in the chamber; and means for moving glass through the tempering chamber.

4. In a lehr, a tempering chamber for tempering glass articles; a plurality of hollow radiants located within the tempering chamber and having open ends, the end edges spaced from the side walls of the tempering chamber; a burner for directing a flame into one end of each of the radiants; a combustion-gas exhaust pipe protruding through the other end of each of the radiants to a point within the radiant; means, individual to each radiant and connected to said pipe, certain of each of said means for withdrawing products of combustion from within the radiant and other of the said means for withdrawing gas from the radiant and the tempering chamber to control the flow of heated gas in the tempering chamber; and means for moving the glass through the tempering chamber.

5. In a lehr, a tempering chamber for tempering glass articles; a plurality of hollow radiants located in the tempering chamber, each radiant having openings connecting the interior of the radiant with the interior of the tempering chamber; a flame pressure regulator for projecting a flame of desired pressure into each of the radiants; means, individual to each radiant, for withdrawing products of combustion therefrom and for varying the pressure at the openings to the tempering chamber relative to the pressure produced therein by the flame pressure regulator to vary the zonal temperature in the tempering chamber; and means for supporting the glass articles above the radiants and for moving the glass articles through the tempering chamber over the radiants.

6. In a lehr, a tempering chamber for tempering sheet glass; a plurality of hollow radiants located in the tempering chamber, each radiant having end openings connecting the interior of the radiant with the interior of the tempering chamber; a flame pressure regulator for projecting a flame of desired pressure into each of the radiants; an exhaust pressure regulator for withdrawing products of combustion from each radiant to vary the pressure at the openings of the radiants and the zonal temperature in the tempering chamber; a plurality of rollers for supporting the glass in the tempering chamber above the radiants; and means interconnecting the rollers for rotating the rollers to move the sheet glass through the zones of the tempering chamber.

FRANZ G. SCHWALBE.